Patented Nov. 10, 1953

2,658,898

UNITED STATES PATENT OFFICE 2,658,898

ANTHRAQUINONE DYESTUFFS

John R. Adams, Jr., Summit, and Victor S. Salvin, Irvington, N. J., assignors to Celanese Corporation of America, New York, N. Y., a corporation of Delaware No Drawing. Application October 19, 1951,
Serial No. 252,211

6 Claims. (Cl. 260—272)

1

This invention relates to the production of dyestuffs and relates more particularly to the production of anthraquinone dyestuffs which dye cellulose acetate or other organic derivative of cellulose textile materials in valuable blue shades resistant to acid fading.

An object of this invention is the production of novel anthraquinone dyestuffs capable of dyeing cellulose acetate or other organic derivative of cellulose textile materials in desirable blue shades.

Another object of this invention is the production of blue anthraquinone dyestuffs having an affinity for cellulose acetate or other organic derivative of cellulose textile materials and dyeing said textile materials in blue shades which are fast to acid fading.

Other objects of this invention will appear from the following detailed description.

Dyestuffs of the anthraquinone group which dye cellulose acetate or other organic derivative of cellulose textile materials in valuable blue shades which are relatively fast to light and to washing are known but many of these dyestuffs are not acceptable commercially due to their inability to resist permanent changes in shade when exposed to atmospheric gases. Much effort has been expended in the development of blue dyestuffs which are resistant to acid fading and in the development of inhibiting agents which impart some measure of resistance to acid-fading to cellulose acetate or other organic derivative of cellulose textile materials dyed in blue shades with certain anthraquinone dyestuffs. Although some measurable advance has been achieved, the problem can by no means be considered to be satisfactorily solved.

We have now found that anthraquinone dyestuffs of the following general formula:

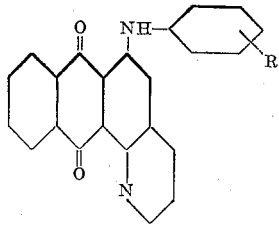

wherein R is a monovalent substituent in the para, meta or ortho position, dye cellulose acetate or other organic derivative of cellulose textile materials in valuable blue shades which are not only fast to light and to washing but, in addition, the dyed textile materials obtained exhibit a

2 marked resistance to acid fading. In the novel dyestuff structure of our invention, R may be hydrogen, an alkyl group, such as, for example methyl, ethyl, isopropyl or butyl, a hydroxy group, a hydroxy methyl group, an alkoxy group such as a methoxy, ethoxy or propoxy group, a halogen such as chlorine, bromine or fluorine, cyano, carboxy, carbalkoxy wherein the carboxy group is esterified with an alcohol such as methanol, ethanol, n-propanol, isopropanol, n-butanol or isobutanol, an acylamino group such as acetylamino, dialkylamino such as dimethylamino and diethylamino and aryl groups such as phenyl or naphthyl, for example. R may represent one or more of the same or different groups.

The novel dyestuffs of our invention include, for example, 1-anilido-3,4(N)-pyridino-anthraquinone, 1-toluidino-3,4(N)-pyridino-anthraquinone, 1 - p - hydroxy - methylamino - 3,4(N)-pyridino-anthraquinone, 1-p-methoxy-phenylamino - 3,4(N) - pyridino - anthraquinone, 1 - p-chloro - phenylamino - 3,4(N) - pyridino - anthraquinone, 1 - m - acetylamino - phenylamino-3,4(N) - pyridino - anthraquinone, 1 - p - dimethylamino - phenylamino - 3,4(N) - pyridino - anthraquinone.

The novel dyestuffs of our invention may be obtained by reacting 1-hydroxy-3,4(N)-pyridino-anthraquinone with the desired arylamine or substituted arylamine whereby the 1-hydroxy group is replaced by an arylamino group. The intermediate 1-hydroxy-3,4(N)-pyridino-anthraquinone is obtained when 1-hydroxy-4-amino-anthraquinone is reacted with glycerol in concentrated sulfuric acid in accordance with the Skraup synthesis.

In carrying out the amination reaction whereby the 1-hydroxy group is replaced, the 1-hydroxy-3,4(N)-pyridino-anthraquinone is first vatted to the leuco form with the aid of sodium hydrosulfite and sodium hydroxide and while in leuco form the vatted anthraquinone compound is then reacted with the desired arylamine in the presence of a suitable amination catalyst such as boric acid, copper powder or manganese dioxide. The amination reaction is carried out in an aqueous medium under reflux, the refluxing being carried out preferably for from 10 to 30 hours to ensure complete reaction. After the amination reaction is completed, the reaction product is converted to the oxidized form by bubbling air through the reaction mixture and the insoluble product formed is filtered from the supernatant liquid, washed and dried. Further purification may be effected by warming the product in aqueous alcoholic sodium hydroxide, i. e. in an aqueous solution containing 10 to 30% by weight of ethyl alcohol and 3 to 8% by weight of sodium hydroxide, and then filtering the product.

In order further to illustrate our invention but without being limited thereto, the following examples are given:

*Example I*

A mixture of 45 parts by weight of 1-hydroxy-4-amino anthraquinone, 330 parts by weight of glycerol and 3 parts by weight of nitrobenzene, in concentrated sulfuric acid, are heated at 100 to 120° C. for 6 hours, the mixture being then cooled to about 25° C. and added to 3,000 parts by weight of water. The mixture is then filtered, washed thoroughly with water and the filter cake taken up in about 500 parts by weight of a 5% by weight aqueous solution of hydrochloric acid. After thorough mixing the acid slurry is filtered and the filter cake obtained is washed thoroughly with water and dried. The intermediate 1-hydroxy-3,4(N)-pyridino-anthraquinone is obtained in a yield of 80% of theory.

*Example II*

A mixture of 5 parts by weight of 1-hydroxy-3,4(N)-pyridino-anthraquinone, 8 parts by weight of sodium hydrosulfite, 30 parts by weight of an aqueous 50% by weight solution of sodium hydroxide and 150 parts by weight of water is heated at 60 to 70° C. for 1 hour to vat the anthraquinone intermediate. After cooling to 20° C., 100 parts by weight of water are added and the mixture acidified with 33% aqueous acetic acid. The reaction mixture is filtered to separate the leuco compound and the latter is then thoroughly washed with water and partly dried. The partly dried leuco compound is then placed in a reaction vessel together with 5 parts by weight of aniline, 3 parts by weight of boric acid and 28 parts by weight of ethanol. This mixture is heated to reflux temperature and held under reflux for 20 hours. The hot mixture is then added to 200 parts by weight of water containing about ¼ part by weight of sodium hydroxide and the mixture obtained is thoroughly aerated by bubbling air through it for about 1 hour. The aerated mixture is then filtered, and the filter cake is washed with water and dried. A yield of 3.5 parts by weight of 1-anilino-3,4(N)-pyridino-anthraquinone is obtained. This dyestuff dyes cellulose acetate in a desirable reddish blue shade having a good fastness to light on 48 hours exposure, moderate affinity and excellent resistance to acid fading even after 3 units exposure in accordance with the standard A. A. T. C. C. test.

*Example III*

A mixture of 5 parts by weight of 1-hydroxy-3,4(N)-pyridino-anthraquinone, 8 parts by weight of sodium hydrosulfite, 30 parts by weight of an aqueous 50% by weight solution of sodium hydroxide and 150 parts by weight of water is heated at 60 to 70° C. for 1 hour to vat the anthraquinone intermediate. After cooling to 20° C., 100 parts by weight of water are added and the resulting mixture acidified with 33% aqueous acetic acid. The reaction mixture is filtered to separate the leuco compound and the latter is then thoroughly washed with water and partly dried. The partly dried leuco compound is then placed in a reaction vessel together with 6 parts by weight of p-toluidine, 3 parts by weight of boric acid and 28 parts by weight of ethanol. This mixture is heated to reflux temperature and held under reflux for 20 hours. The hot mixture is then added to 200 parts by weight of water containing about ¼ part by weight of sodium hydroxide and the mixture thoroughly aerated by bubbling air through it for about 1 hour. The mixture is filtered, and the filter cake washed with water and dried. A yield of 4.7 parts by weight of 1-p-toluidino-3,4(N)-pyridino-anthraquinone is obtained. This dyestuff also dyes cellulose acetate materials in a reddish blue shade having moderate affinity. The dyed fabric is fast to light on 48 hours exposure and no change in shade is noted even after an exposure of 3 units in the standard A. A. T. C. C. test for resistance to acid fading.

It is to be understood that the foregoing detailed description is given merely by way of illustration and that many variations may be made therein without departing from the spirit of our invention.

Having described our invention, what we desire to secure by Letters Patent is:

1. Process for the production of dyestuff of the following general formula:

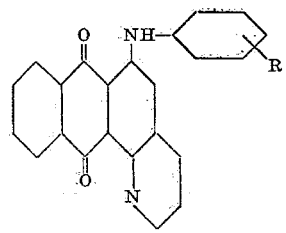

wherein R is a member of the class consisting of hydrogen, lower alkyl, lower alkoxy, hydroxy lower alkyl, cyano, hydroxy, halogen, carboxy, lower carbalkoxy, lower fatty acylamino, lower dialkylamino and aryl hydrocarbon groups, which comprises vatting 1-hydroxy-3,4(N)-pyridino-anthraquinone and reacting said vatted compound with an amine of the formula

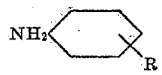

2. Process for the production of dyestuff of the following general formula:

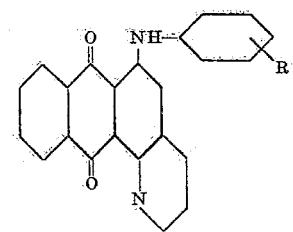

wherein R is a member of the class consisting of hydrogen, lower alkyl, lower alkoxy, hydroxy lower alkyl, cyano, hydroxy, halogen, carboxy, lower carbalkoxy, lower fatty acylamino, lower dialkylamino and aryl hydrocarbon groups, which comprises vatting 1-hydroxy-3,4(N)-pyridino-anthraquinone and reacting said vatted compound in an aqueous medium under reflux with an amine of the formula

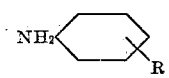

3. Process for the production of dyestuff of the following general formula:

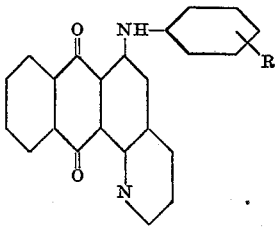

wherein R is a member of the class consisting of hydrogen, lower alkyl, lower alkoxy, hydroxy lower alkyl, cyano, hydroxy, halogen, carboxy, lower carbalkoxy, lower fatty acylamino, lower dialkylamino and aryl hydrocarbon groups, which comprises vatting 1-hydroxy-3,4(N)-pyridino-anthraquinone and catalytically reacting said vatted compound in an aqueous medium under reflux with an amine of the formula

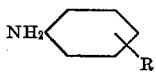

4. Process for the production of 1-anilido-3,4(N)-pyridino-anthraquinone, which comprises vatting 1-hydroxy-3,4(N)-pyridino-anthraquinone and reacting said intermediate while in the leuco form with aniline.

5. Process for the production of 1-p-toluidino-3,4(N)-pyridino-anthraquinone, which comprises vatting 1-hydroxy-3,4(N)-pyridino-anthraquinone and reacting said intermediate while in the leuco form with p-toluidine.

6. Process for the production of 1-p-hydroxymethylphenyl-amino - 3,4(N)-pyridino - anthraquinone, which comprises vatting 1-hydroxy-3,4(N) - pyridino - anthraquinone and reacting said intermediate while in the leuco form with p-hydroxymethylaniline.

JOHN R. ADAMS, JR.
VICTOR S. SALVIN.

References Cited in the file of this patent

UNITED STATES PATENTS

| Number | Name | Date |
|---|---|---|
| 2,094,463 | Nawiasky et al. | Sept. 28, 1937 |
| 2,124,238 | Scheyer et al. | July 19, 1938 |